United States Patent
Yochai

(10) Patent No.: US 9,471,429 B2
(45) Date of Patent: Oct. 18, 2016

(54) SCALABLE PROTECTION SCHEME FOR PROTECTING DESTAGED DATA UNITS

(71) Applicant: INFINIDAT LTD., Herzliya (IL)

(72) Inventor: Yechiel Yochai, Moshav Aviel (IL)

(73) Assignee: INFINIDAT LTD., Herzliya (IL)

( * ) Notice: Subject to any disclaimer, the term of this patent is extended or adjusted under 35 U.S.C. 154(b) by 232 days.

(21) Appl. No.: 14/153,098

(22) Filed: Jan. 13, 2014

(65) Prior Publication Data

US 2015/0199237 A1    Jul. 16, 2015

(51) Int. Cl.
*G06F 11/00*    (2006.01)
*G06F 11/10*    (2006.01)

(52) U.S. Cl.
CPC ....... *G06F 11/1096* (2013.01); *G06F 11/1088* (2013.01); *G06F 11/1076* (2013.01); *G06F 2211/1009* (2013.01)

(58) Field of Classification Search
CPC ........... G06F 11/1076; G06F 11/1096; G06F 11/1088
See application file for complete search history.

(56) References Cited

U.S. PATENT DOCUMENTS

| | | | |
|---|---|---|---|
| 7,346,831 B1 * | 3/2008 | Corbett | 714/770 |
| 2005/0166083 A1 * | 7/2005 | Frey et al. | 714/6 |
| 2007/0067696 A1 * | 3/2007 | Bhatt et al. | 714/758 |
| 2010/0115335 A1 * | 5/2010 | Wylie et al. | 714/25 |
| 2011/0314219 A1 * | 12/2011 | Ulrich et al. | 711/114 |

\* cited by examiner

*Primary Examiner* — M. Mujtaba K Chaudry
(74) *Attorney, Agent, or Firm* — Reches Patents

(57) ABSTRACT

A method for disk failure protection, the method may include calculating a first set of parity units by processing a first group of sets of data units that are cached in a cache memory of a storage system; calculating a second set of parity units by processing the first group of sets of data units; wherein the calculating of the second set of parity units is responsive to a first shift that was virtually introduced between each set of data units of the first group of sets of data units; and destaging the first group of sets of data units and the first and second sets of parity units to the first group of disks.

14 Claims, 12 Drawing Sheets

FIG. 4

Calculating a first set of parity units by processing a first group of sets of data units that are cached in a cache memory of a storage system. The first set of parity units facilitates a reconstruction of the first group of data units when a first number of disks out of a first group of disks fail. 210

Calculating, for each value of q1, a q1'th parity unit of the first set of parity units by applying a first selection function on the first group of sets of data units for selecting at least one first selected data unit and processing the at least one first selected data unit to provide the q1'th parity unit. 212

Calculating a second set of parity units by processing the first group of the sets of the data units. The calculating of the second set of parity bits is responsive to a first shift that was virtually introduced between each set of data units of the first group of sets of data units. A combination of the first and second sets of parity units facilitate a reconstruction of the first group of sets of data units when a second number of disks of the first group of disks fail. The second number is bigger than the first number. 220

Calculating, for each value of q2, a q2'th parity unit of the second set of parity units by processing n'th data units of m'th sets of data units of that fulfills q2=(n+[S1*{m-1}]). 222

Calculating, for each value of q2, a q2'th parity unit of the second set of parity units by applying a first selection function on the first group of sets of data units while taking into account the first shift that was virtually introduced between each set of data units of the first group of sets of data units for selecting at least one second selected data unit; and processing the at least one second selected data unit to provide the q2'th parity unit. 224

Destaging the first group of sets of data units and the first and second groups of parity units to the first group of disks. 230

```
┌─────────────────────────────────────────────────────────────────────────┐
│ Calculating a first set of parity units by processing a first group of sets of data units that │
│ are cached in a cache memory of a storage system. The first set of parity units facilitates │
│ a reconstruction of the first group of data units when a first number of disks out of a first │
│                        group of disks fail. 210                         │
└─────────────────────────────────────────────────────────────────────────┘
                                    │
                                    ▼
┌─────────────────────────────────────────────────────────────────────────┐
│   Calculating a second set of parity units by processing the first group of the sets of the │
│ data units. The calculating of the second set of parity bits is responsive to a first shift that │
│ was virtually introduced between each set of data units of the first group of sets of data │
│ units. A combination of the first and second sets of parity units facilitate a reconstruction │
│ of the first group of sets of data units when a second number of disks of the first group of │
│           disks fail. The second number is bigger than the first number. 220           │
└─────────────────────────────────────────────────────────────────────────┘
                                    │
                                    ▼
┌─────────────────────────────────────────────────────────────────────────┐
│ Calculating a third set of parity units by processing the first group of the sets of the data │
│ units. The calculating of the third set of parity units is responsive to a second shift that │
│ was virtually introduced between each set of data units of the first group of sets of data │
│ units. The third number is bigger than the second number. A combination of the first, │
│ second and third sets of parity units facilitate a reconstruction of the first group of sets of │
│     data units when a third number of disks of the first group of disks fail. 330     │
│ ┌─────────────────────────────────────────────────────────────────────┐ │
│ │ Calculating, for each value of q3, a q3'th parity unit of the second set of parity units, │ │
│ │          by processing n'th data units of m'th sets of data units of that fulfills          │ │
│ │                           q3=(n+[S2*{m-1}]). 332                            │ │
│ └─────────────────────────────────────────────────────────────────────┘ │
│ ┌─────────────────────────────────────────────────────────────────────┐ │
│ │ Calculating, for each value of q3, a q3'th parity unit of the third set of parity units │ │
│ │  by applying the first selection function on the first group of sets of data units while  │ │
│ │  taking into account the second shift that was virtually introduced between each set  │ │
│ │    of data units of the first group of sets of data units for selecting at least one third    │ │
│ │   selected data unit; and processing the at least one third selected data unit to provide   │ │
│ │                           the q3'th parity unit. 334                           │ │
│ └─────────────────────────────────────────────────────────────────────┘ │
└─────────────────────────────────────────────────────────────────────────┘
                                    │
                                    ▼
┌─────────────────────────────────────────────────────────────────────────┐
│  Destaging the first group of sets of data units, and the first, second and third groups of  │
│                    parity units to the first group of disks. 340                    │
└─────────────────────────────────────────────────────────────────────────┘

SCALABLE PROTECTION SCHEME FOR PROTECTING DESTAGED DATA UNITS

BACKGROUND

A disk storage or disc storage is a general category of storage mechanisms, in which data are digitally recorded by various electronic, magnetic, optical, or mechanical methods on a surface layer deposited of one or more planar, round and rotating disks (or discs) (also referred to as the media).

A disk (also referred to as a disk drive) is a device implementing such a storage mechanism with fixed or removable media; with removable media the device is usually distinguished from the media as in compact disc drive and the compact disc.

Notable types are the hard disk drives (HDD) containing a non-removable disk, the floppy disk drive (FDD) and its removable floppy disk, and various optical disc drives and associated optical disc media (www.wikipedia.org).

RAID (redundant array of independent disks) is a storage technology that combines multiple disks into a logical unit. Data is distributed across the drives in one of several ways called "RAID levels", depending on the level of redundancy and performance required (www.wikipedia.org).

RAID is used as an umbrella term for computer data storage schemes that can divide and replicate data among multiple physical drives: RAID is an example of storage virtualization and the array can be accessed by the operating system as one single drive.

The different schemes or architectures are named by the word RAID followed by a number (e.g., RAID 0, RAID 1, RAID 2, RAID 3, RAID 4, RAID 5, RAID 6 and RAID 10). Each scheme provides a different balance between the key goals: reliability and availability, performance and capacity. RAID levels greater than RAID 0 provide protection against unrecoverable (sector) read errors, as well as whole disk failure.

A number of standard schemes have evolved which are referred to as levels. There were five RAID levels originally conceived, but many more variations have evolved, notably several nested levels and many non-standard levels (mostly proprietary). RAID levels and their associated data formats are standardized by the Storage Networking Industry Association (SNIA) in the Common RAID Disk Drive Format (DDF) standard.

RAID 5, 6 and 10 levels are commonly used in the industry.

RAID 5 (block-level striping with distributed parity) distributes parity along with the data and requires all drives but one to be present to operate. The array is not destroyed by a single drive failure. Upon drive failure, any subsequent reads can be calculated from the distributed parity such that the drive failure is masked from the end user. RAID 5 requires at least three disks.

RAID 6 (block-level striping with double distributed parity) provides fault tolerance up to two failed drives. This makes larger RAID groups more practical, especially for high-availability systems. This becomes increasingly important as large-capacity drives lengthen the time needed to recover from the failure of a single drive. Like RAID 5, a single drive failure results in reduced performance of the entire array until the failed drive has been replaced and the associated data rebuilt.

In RAID 10 (often referred to as RAID 1+0) (mirroring and striping), data are written in stripes across primary disks that have been mirrored to the secondary disks.

Modern storage systems may include large numbers of disk drives. There is a growing need to provide reliable and efficient storage systems RAID 5 calculates a single parity block for multiple data blocks.

The parity block is calculated as the XOR of all data blocks. RAID 5 provides an ability to recover from a single disk failure. The reconstruction of a failed disk requires reading all other disks. There is a relatively high risk for a second disk failure during the reconstruction of the failed disk.

RAID 6 calculates a pair of parity blocks for multiple data blocks. Parity blocks are calculated as XOR and Galois field (GF) multiplication of all data blocks.

RAID 6 provides the ability to recover from up to 2 disk failures. The reconstruction of failed disks requires reading all other disks.

For a RAID 6, just using two XOR functions is not sufficient. If two disks in a RAID6 array fail, it is not possible to determine data blocks location using the XOR function alone.

Evenodd is a known scheme for tolerating double disk failures that is optimal with regard to both storage and performance. Evenodd employs the addition of only two redundant disks and consists of simple exclusive-OR computations. A standard Evenodd arranges p+2 columns (data portions in a stripe) and (p−1) rows (stripes), where p is the number of disks in the RAID. Evenodd uses two parities, an horizontal parity, which simply XOR the p+2 data portions in the RAID stripe and a diagonal parity that is calculated by XORing data values across RAID stripes more or less diagonally. The Evenodd technique places constraints on the width of a RAID stripe and requires a prime number (p) of disks in the RAID. The even-odd algorithm cannot be easily modified for extending the protection to 3 disk failures and almost impossible to be modified for supporting more than 3 disk failures.

Another scheme for tolerating double disk failures that employs optimal redundant storage (only two extra disks for two parities) is based on Reed-Solomon error correction and requires computation over finite fields. Reed-Solomon algorithm can support multiple disk failure but results in a more complex implementation. The normal write as well as the rebuild process of a failed disk is very intensive in term of CPU power.

It was believed to have relatively low risk for a third disk to fail during the reconstruction of two failed disks.

The amount of data stored in today's data-centers is rapidly growing, while reliability is becoming more important than ever before.

As a result, storage density is also growing, while disk drive failure rate is not improving.

This poses major scalability challenges on RAID schemes, due to the increased number of disks, and increased chance for double and triple faults during long disk rebuild times.

There is a growing need to provide efficient systems and methods for providing scalable RAID schemes.

SUMMARY

According to an embodiment of the invention various methods may be provided and are described in the specification. According to various embodiments of the invention there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages—and any combinations of same.

According to an embodiment of the invention there may be provided a method for disk failure protection, the method may include calculating a first set of parity units by processing a first group of sets of data units that are cached in a cache memory of a storage system; wherein the first set of parity units facilitates a reconstruction of the first group of sets of data units when a first number of disks out of a first group of disks fail; calculating a second set of parity units by processing the first group of sets of data units; wherein the calculating of the second set of parity units is responsive to a first shift that was virtually introduced between each set of data units of the first group of sets of data units; wherein a combination of the first and second sets of parity units facilitate a reconstruction of the first group of sets of data units when a second number of disks of the first group of disks fail; wherein the second number is bigger than the first number; and destaging the first group of sets of data units and the first and second sets of parity units to the first group of disks.

Each set of data units may include multiple (N) data units; wherein the first group of sets of data units may include multiple (M) sets of data units; wherein the first shift equals at least one (S1) data unit; wherein the first set of parity units may include N parity units; and wherein the second set of parity units may include N+(M−1)*S1 parity units.

Each set of data units may include multiple (N) data units; wherein the first group of sets of data units may include multiple (M) sets of data units; wherein the first shift equals at least one (S1) data unit; wherein a first index m may be indicative of an order of a set of data unit within the first group of sets of data units; wherein index n may be indicative of a location of a data unit within a set of data units; wherein index q2 may be indicative of a location of a parity unit within the second set of parity units; wherein the method may include calculating, for each value of q2, a q2'th parity unit of the second set of parity units by processing n'th data units of m'th sets of data units of that fulfills q2=(n+[S1*{m−1}]).

Index q may be indicative of a location of a parity unit within the first set of parity units; wherein index q2 may be indicative of a location of a parity unit within the second set of parity units; wherein the method may include: calculating, for each value of q, a q1'th parity unit of the first set of parity units by: applying a first selection function on the first group of sets of data units for selecting at least one first selected data unit; processing the at least one first selected data unit to provide the q1'th parity unit; and calculating, for each value of q2, a q2'th parity unit of the second set of parity units by: applying the first selection function on the first group of sets of data units while taking into account the first shift that was virtually introduced between each set of data units of the first group of sets of data units for selecting at least one second selected data unit; and processing the at least one second selected data unit to provide the q2'th parity unit.

The method may include calculating a third set of parity units by processing the first group of the sets of the data units; wherein the calculating of the third set of parity units is responsive to a second shift that was virtually introduced between each set of data units of the first group of sets of data units; wherein a combination of the first, second and third sets of parity units facilitate a reconstruction of the first group of sets of data units when a third number of disks of the first group of disks fail; wherein the third number is bigger than the second number; and wherein the destaging may include destaging the third set of parity units to the first group of disks.

Each set of data units may include multiple (N) data units; wherein the first group may include multiple (M) sets of data units; wherein the first shift equals at least one (S1) data units; wherein the second shift (S2) exceeds one and different from S1; wherein the first set of parity units may include N parity units, the second set of parity units may include N+(M−1)*S1 parity units and the third set of parity unit may include N+(M−1)*S2 parity units.

Each set of data units may include multiple (N) data units; wherein the first group may include multiple (M) sets of data units; wherein the first shift equals at least one (S1) data unit; wherein the second shift (S2) exceeds one and different from S1; wherein first index m may be indicative of an order of a set of data units within the first group of sets of data units; wherein index n may be indicative of a location of a data unit within a set of data units; wherein index q2 may be indicative of a location of a parity unit within the second set of parity units; wherein index q3 may be indicative of a location of a parity unit within the third set of parity units; wherein the method may include: calculating, for each value of q2, a q2'th parity unit of the second set of parity units, by processing n'th data units of m'th sets of data units of that fulfills q2=(n+[S1*{m−1}]); and calculating, for each value of q3, a q3'th parity unit of the second set of parity units, by processing n'th data units of m'th sets of data units of that fulfills q3=(n+[S2*{m−1}]).

Index q1 may be indicative of a location of a parity unit within the first set of parity units; wherein index q2 may be indicative of a location of a parity unit within the second set of parity units; wherein index q3 may be indicative of a location of a parity unit within the third set of parity units; wherein the method may include: calculating, for each value of q1, a q1'th parity unit of the first set of parity units by: applying a first selection function on the first group of sets of data units for selecting at least one first selected data unit; processing the at least one first selected data unit to provide the q1'th parity unit; calculating, for each value of q2, a q2'th parity unit of the second set of parity units by: applying the first selection function on the first group of sets of data units while taking into account the first shift that was virtually introduced between each set of data units of the first group of sets of data units for selecting at least one second selected data unit; processing the at least one second selected data unit to provide the q2'th parity unit; and calculating, for each value of q3, a q3'th parity unit of the third set of parity units by: applying the first selection function on the third group of sets of data units while taking into account the second shift that was virtually introduced between each set of data units of the first group of sets of data units for selecting at least one third selected data unit; and processing the at least one third selected data unit to provide the q3'th parity unit.

The method further may include receiving an indication that a certain sub-group of disks of the first group of disks failed, wherein the certain sub-group is formed from a second number of disks; retrieving, from disks of the first group of disks that do not belong to the certain sub-group of disks, retrieved data and parity units; and reconstructing the first group of sets of data units based upon the retrieved data and parity units.

The reconstructing may include starting the reconstructing from combinations of retrieved data and parity units that lack data or parity units that were stored in either one of the certain sub-group of disks.

The method may include calculating, in addition to the first and second sets of parity units, additional (K−2) sets of parity units, wherein K is a positive integer that exceeds two, wherein for each value of index k that ranges between 3 and K, calculating a k'th set of parity units by processing the first group of sets of data units; wherein the calculating of the k'th set of parity units is responsive to a (k−1) shift that was virtually introduced between each set of data units of the first group of sets of data units; wherein a combination of the first set of parity units, the second set of parity units and the additional (K−2) sets of parity units facilitate a reconstruction of the first group of sets of data units when a K'th number of disks of the first group of disks fail.

The first shift, the second shift and each one of a (K−2) shifts may differ from each other.

According to an embodiment of the invention there may be provided a non-transitory computer readable medium that stores instructions that once executed by a computerized system, cause the computerized system to execute the stages of: calculating a first set of parity units by processing a first group of sets of data units that are cached in a cache memory of a storage system; wherein the first set of parity units facilitates a reconstruction of the first group of sets of data units when a first number of disks out of a first group of disks fail; calculating a second set of parity units by processing the first group of sets of data units; wherein the calculating of the second set of parity units is responsive to a first shift that was virtually introduced between each set of data units of the first group of sets of data units; wherein a combination of the first and second sets of parity units facilitate a reconstruction of the first group of sets of data units when a second number of disks of the first group of disks fail; wherein the second number is bigger than the first number; and destaging the first group of sets of data units and the first and second sets of parity units to the first group of disks.

Each set of data units may include multiple (N) data units; wherein the first group of sets of data units may include multiple (M) sets of data units; wherein the first shift equals at least one (S1) data unit; wherein the first set of parity units may include N parity units; and wherein the second set of parity units may include N+(M−1)*S1 parity units.

Each set of data units may include multiple (N) data units; wherein the first group of sets of data units may include multiple (M) sets of data units; wherein the first shift equals at least one (S1) data unit; wherein a first index m may be indicative of an order of a set of data unit within the first group of sets of data units; wherein index n may be indicative of a location of a data unit within a set of data units; wherein index q2 may be indicative of a location of a parity unit within the second set of parity units; wherein the non-transitory computer readable medium may store instructions for calculating, for each value of q2, a q2'th parity unit of the second set of parity units by processing n'th data units of m'th sets of data units of that fulfills q2=(n+[S1*{m−1}]).

Index q may be indicative of a location of a parity unit within the first set of parity units; wherein index q2 may be indicative of a location of a parity unit within the second set of parity units; wherein the non-transitory computer readable medium may store instructions for calculating, for each value of q, a q1'th parity unit of the first set of parity units by: applying a first selection function on the first group of sets of data units for selecting at least one first selected data unit; processing the at least one first selected data unit to provide the q1'th parity unit; and calculating, for each value of q2, a q2'th parity unit of the second set of parity units by: applying the first selection function on the first group of sets of data units while taking into account the first shift that was virtually introduced between each set of data units of the first group of sets of data units for selecting at least one second selected data unit; and processing the at least one second selected data unit to provide the q2'th parity unit.

The non-transitory computer readable medium may store instructions for calculating a third set of parity units by processing the first group of the sets of the data units; wherein the calculating of the third set of parity units is responsive to a second shift that was virtually introduced between each set of data units of the first group of sets of data units; wherein a combination of the first, second and third sets of parity units facilitate a reconstruction of the first group of sets of data units when a third number of disks of the first group of disks fail; wherein the third number is bigger than the second number; and wherein the destaging may include destaging the third set of parity units to the first group of disks.

Each set of data units may include multiple (N) data units; wherein the first group may include multiple (M) sets of data units; wherein the first shift equals at least one (S1) data units; wherein the second shift (S2) exceeds one and different from S1; wherein the first set of parity units may include N parity units, the second set of parity units may include N+(M−1)*S1 parity units and the third set of parity unit may include N+(M−1)*S2 parity units.

Each set of data units may include multiple (N) data units; wherein the first group may include multiple (M) sets of data units; wherein the first shift equals at least one (S1) data unit; wherein the second shift (S2) exceeds one and different from S1; wherein first index m may be indicative of an order of a set of data units within the first group of sets of data units; wherein index n may be indicative of a location of a data unit within a set of data units; wherein index q2 may be indicative of a location of a parity unit within the second set of parity units; wherein index q3 may be indicative of a location of a parity unit within the third set of parity units; wherein the non-transitory computer readable medium may store instructions for calculating, for each value of q2, a q2'th parity unit of the second set of parity units, by processing n'th data units of m'th sets of data units of that fulfills q2+(n+[S1*{m−1}]); and calculating, for each value of q3, a q3'th parity unit of the second set of parity units, by processing n'th data units of m'th sets of data units of that fulfills q3+(n+[S2*{m−1}]).

Index q1 may be indicative of a location of a parity unit within the first set of parity units; wherein index q2 may be indicative of a location of a parity unit within the second set of parity units; wherein index q3 may be indicative of a location of a parity unit within the third set of parity units; wherein the non-transitory computer readable medium may store instructions for calculating, for each value of q1, a q1'th parity unit of the first set of parity units by: applying a first selection function on the first group of sets of data units for selecting at least one first selected data unit; processing the at least one first selected data unit to provide the q1'th parity unit; calculating, for each value of q2, a q2'th parity unit of the second set of parity units by: applying the first selection function on the first group of sets of data units while taking into account the first shift that was virtually introduced between each set of data units of the first group of sets of data units for selecting at least one second selected data unit; processing the at least one second selected data unit to provide the q2'th parity unit; and calculating, for each value of q3, a q3'th parity unit of the third set of parity units by: applying the first selection function on the third group of sets of data units while taking into account the second shift that was virtually introduced between each set of data units of the first group of sets of data units for selecting at least one third selected data unit; and processing the at least one third selected data unit to provide the q3'th parity unit.

The non-transitory computer readable medium may store instructions for receiving an indication that a certain sub-group of disks of the first group of disks failed, wherein the certain sub-group is formed from a second number of disks; retrieving, from disks of the first group of disks that do not belong to the certain sub-group of disks, retrieved data and parity units; and reconstructing the first group of sets of data units based upon the retrieved data and parity units.

The reconstructing may include starting the reconstructing from combinations of retrieved data and parity units that lack data or parity units that were stored in either one of the certain sub-group of disks.

The non-transitory computer readable medium may store instructions for calculating, in addition to the first and second sets of parity units, additional (K−2) sets of parity units, wherein K is a positive integer that exceeds two, wherein for each value of index k that ranges between 3 and K, calculating a k'th set of parity units by processing the first group of sets of data units; wherein the calculating of the k'th set of parity units is responsive to a (k−1) shift that was virtually introduced between each set of data units of the first group of sets of data units; wherein a combination of the first set of parity units, the second set of parity units and the additional (K−2) sets of parity units facilitate a reconstruction of the first group of sets of data units when a K'th number of disks of the first group of disks fail.

The first shift, the second shift and each one of a (K−2) shifts may differ from each other.

According to an embodiment of the invention there may be provided a storage system that may include a failure recovery unit that is arranged to calculate a first set of parity units by processing a first group of sets of data units that are cached in a cache memory of a storage system; wherein the first set of parity units facilitates a reconstruction of the first group of sets of data units when a first number of disks out of a first group of disks fail; calculate a second set of parity units by processing the first group of sets of data units; wherein the calculating of the second set of parity units is responsive to a first shift that was virtually introduced between each set of data units of the first group of sets of data units; wherein a combination of the first and second sets of parity units facilitate a reconstruction of the first group of sets of data units when a second number of disks of the first group of disks fail; wherein the second number is bigger than the first number; and a storage system controller that is arranged to destage the first group of sets of data units and the first and second sets of parity units to the first group of disks.

Each set of data units may include multiple (N) data units; wherein the first group of sets of data units may include multiple (M) sets of data units; wherein the first shift equals at least one (S1) data unit; wherein the first set of parity units may include N parity units; and wherein the second set of parity units may include N+(M−1)*S1 parity units.

Each set of data units may include multiple (N) data units; wherein the first group of sets of data units may include multiple (M) sets of data units; wherein the first shift equals at least one (S1) data unit; wherein a first index m may be indicative of an order of a set of data unit within the first group of sets of data units; wherein index n may be indicative of a location of a data unit within a set of data units; wherein index q2 may be indicative of a location of a parity unit within the second set of parity units; wherein the storage system may be arranged to calculating, for each value of q2, a q2'th parity unit of the second set of parity units by processing n'th data units of m'th sets of data units of that fulfills q2=(n+[S1*{m−1}]).

Index q may be indicative of a location of a parity unit within the first set of parity units; wherein index q2 may be indicative of a location of a parity unit within the second set of parity units; wherein the storage system may be arranged to calculate, for each value of q, a q1'th parity unit of the first set of parity units by: applying a first selection function on the first group of sets of data units for selecting at least one first selected data unit; processing the at least one first selected data unit to provide the q1'th parity unit; and calculating, for each value of q2, a q2'th parity unit of the second set of parity units by: applying the first selection function on the first group of sets of data units while taking into account the first shift that was virtually introduced between each set of data units of the first group of sets of data units for selecting at least one second selected data unit; and processing the at least one second selected data unit to provide the q2'th parity unit.

The storage system may be arranged to calculate a third set of parity units by processing the first group of the sets of the data units; wherein the calculating of the third set of parity units is responsive to a second shift that was virtually introduced between each set of data units of the first group of sets of data units; wherein a combination of the first, second and third sets of parity units facilitate a reconstruction of the first group of sets of data units when a third number of disks of the first group of disks fail; wherein the third number is bigger than the second number; and wherein the destaging may include destaging the third set of parity units to the first group of disks.

Each set of data units may include multiple (N) data units; wherein the first group may include multiple (M) sets of data units; wherein the first shift equals at least one (S1) data units; wherein the second shift (S2) exceeds one and different from S1; wherein the first set of parity units may include N parity units, the second set of parity units may include N+(M−1)*S1 parity units and the third set of parity unit may include N+(M−1)*S2 parity units.

Each set of data units may include multiple (N) data units; wherein the first group may include multiple (M) sets of data units; wherein the first shift equals at least one (S1) data unit; wherein the second shift (S2) exceeds one and different from S1;

wherein first index m may be indicative of an order of a set of data units within the first group of sets of data units; wherein index n may be indicative of a location of a data unit within a set of data units; wherein index q2 may be indicative of a location of a parity unit within the second set of parity units; wherein index q3 may be indicative of a location of a parity unit within the third set of parity units; wherein the storage system may be arranged to calculate, for each value of q2, a q2'th parity unit of the second set of parity units, by processing n'th data units of m'th sets of data units of that fulfills q2=(n+[S1*{m−1}]); and calculating, for each value of q3, a q3'th parity unit of the second set of parity units, by processing n'th data units of m'th sets of data units of that fulfills q3=(n+[S2*{m−1}]).

Index q1 may be indicative of a location of a parity unit within the first set of parity units; wherein index q2 may be indicative of a location of a parity unit within the second set of parity units; wherein index q3 may be indicative of a location of a parity unit within the third set of parity units; wherein the storage system may be arranged to calculate, for each value of q1, a q1'th parity unit of the first set of parity units by applying a first selection function on the first group of sets of data units for selecting at least one first selected data unit; processing the at least one first selected data unit to provide the q1'th parity unit; calculate, for each value of q2, a q2'th parity unit of the second set of parity units by: applying the first selection function on the first group of sets of data units while taking into account the first shift that was virtually introduced between each set of data units of the first group of sets of data units for selecting at least one second selected data unit; processing the at least one second selected data unit to provide the q2'th parity unit; and calculate, for each value of q3, a q3'th parity unit of the third set of parity units by: applying the first selection function on the third group of sets of data units while taking into account the second shift that was virtually introduced between each set of data units of the first group of sets of data units for selecting at least one third selected data unit; and processing the at least one third selected data unit to provide the q3'th parity unit.

The system may be arranged to receive an indication that a certain sub-group of disks of the first group of disks failed, wherein the certain sub-group is formed from a second number of disks; retrieve, from disks of the first group of disks that do not belong to the certain sub-group of disks, retrieved data and parity units; and reconstruct the first group of sets of data units based upon the retrieved data and parity units.

The reconstructing may include starting the reconstructing from combinations of retrieved data and parity units that lack data or parity units that were stored in either one of the certain sub-group of disks.

The storage system may be arranged to calculate, in addition to the first and second sets of parity units, additional (K−2) sets of parity units, wherein K is a positive integer that exceeds two, wherein for each value of index k that ranges between 3 and K, calculate a k'th set of parity units by processing the first group of sets of data units; wherein the calculating of the k'th set of parity units is responsive to a (k−1) shift that was virtually introduced between each set of data units of the first group of sets of data units; wherein a combination of the first set of parity units, the second set of parity units and the additional (K−2) sets of parity units facilitate a reconstruction of the first group of sets of data units when a K'th number of disks of the first group of disks fail.

The first shift, the second shift and each one of a (K−2) shifts may differ from each other.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 4-6 illustrate the calculations of three sets of parity units according to an embodiment of the invention;

FIGS. 8-11 illustrate methods according to various embodiments of the invention.

Figure 1:
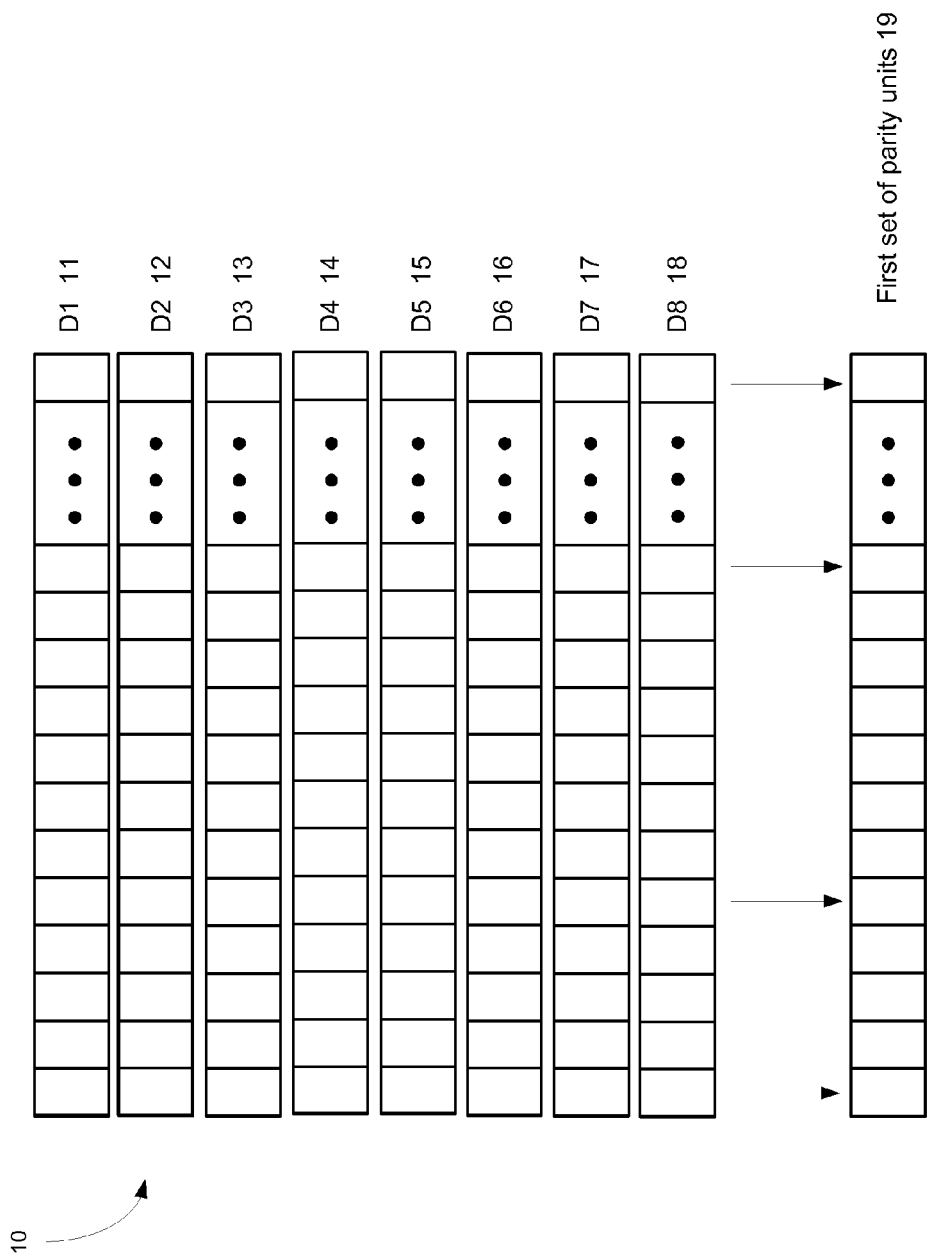
FIGS. 1-3 illustrate the calculations of three sets of parity units according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There is provided scalable failure protection scheme in which a certain failure protection process can be applied for protecting against a failure of a scalable number of disks.

Protection against higher numbers of failed disks will result in calculating a higher number of sets of parity units—without changing the essence of the failure protection scheme.

Figure 2:
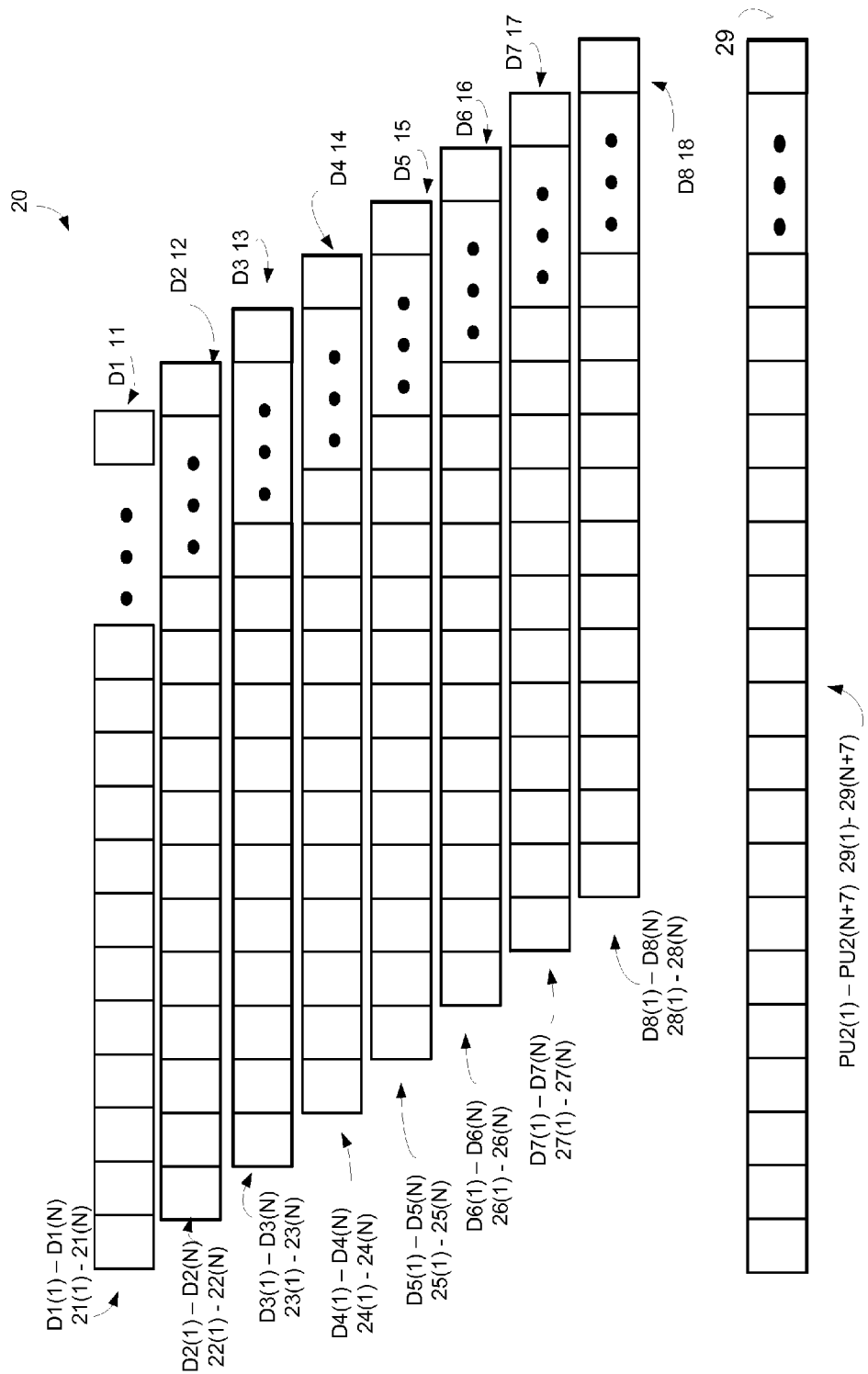
Figure 3:
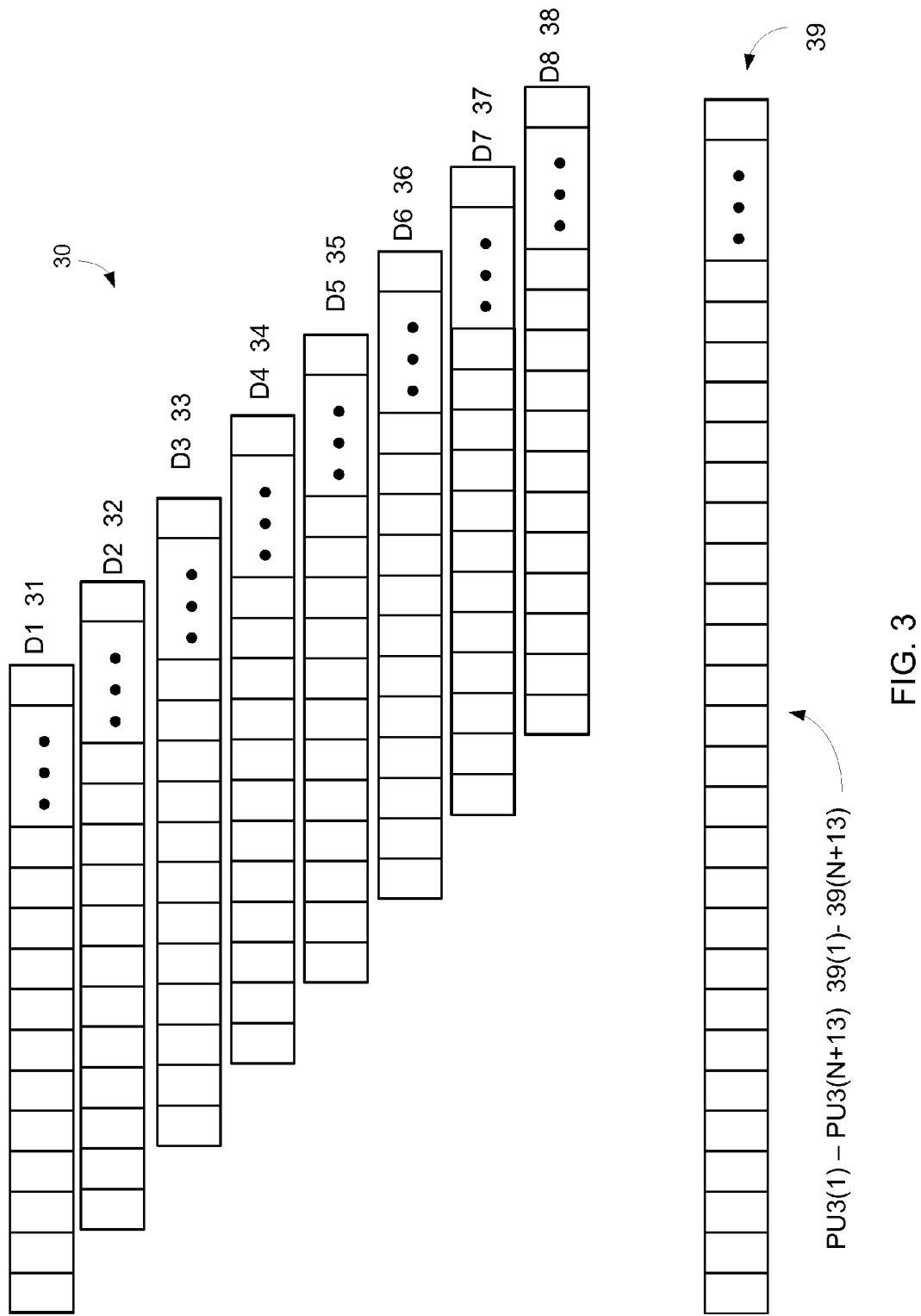

FIGS. 1-3 illustrate the calculations of three sets of parity units according to an embodiment of the invention.

Parity units are calculated by processing a first group of sets of data units. The data unit is an atomic unit of the parity calculation. The size of each data unit and each parity unit may exceed one bit. The size may be (or may exceed) one or more byte, one or more kilobytes, and the like. A typical size of the data unit may be 8 bytes or 4 bytes. The parity units may be of a same size as the data units but may differ by size.

FIG. 1 illustrates a first group 10 of eight sets 11-18 of data units. Each set of data units includes N data units. A first set 19 of N parity units is calculated. N is a positive integer that usually exceeds eight.

An n'th parity unit (index n ranges between 1 and N) of the first set of parity units (P1) is calculated by applying a mathematical function (such as XOR) on the n'th data units of each one of the eight sets 11-18 of data units. For example P1(n)=XOR {D1(n), D2(n), D3(n), D4(n), D5(n), D6(n), D7(n), D8(n)}.

If the first group 10 forms a virtual matrix then each parity unit is calculated by processing a column of that virtual matrix.

FIG. 2 illustrates a second group 20 of eight sets 21-28 of data units. Each set of data units 21-28 includes N data units: D1(1)-D1(N) 21(1)-21(N), D2(1)-D2(N) 22(1)-22(N), D3(1)-D3(N) 23(1)-23(N), D4(1)-D4(N) 24(1)-24(N), D5(1)-D5(N) 25(1)-25(N), D6(1)-D6(N) 26(1)-26(N), D7(1)-D7(N) 27(1)-27(N) and D8(1)-D8(N) 28(1)-28(N).

The second group 20 of data units is obtained by virtually introducing a first shift of one data unit between the eight sets 11-18 of data units of the first group 10 of FIG. 1. The shift is virtual as it may be implemented by changing the selection of data units that should be processed when calculating the parity units of the second set 29 of parity units.

Figure 5:
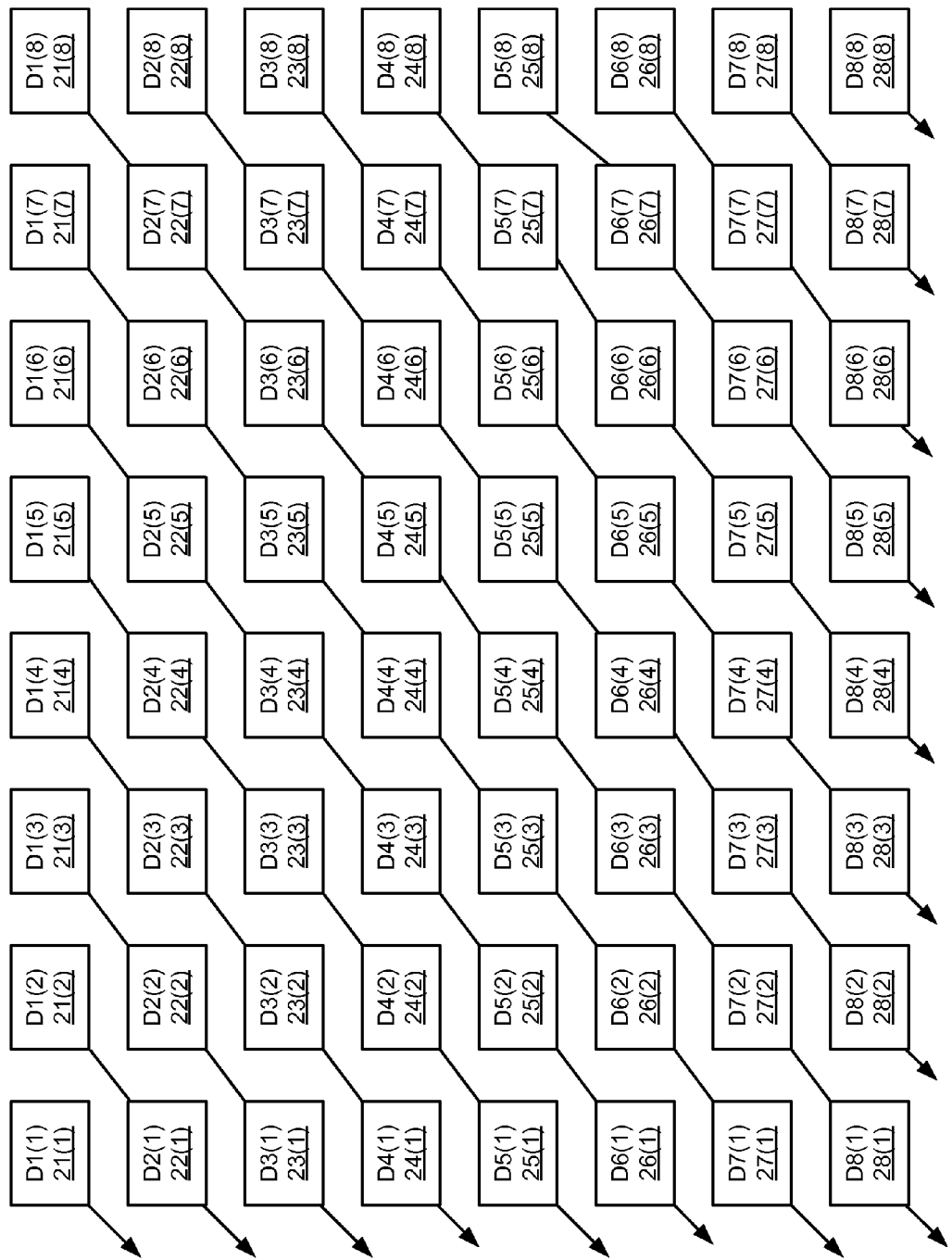

For example—FIG. 5 illustrates (by arrows linking data units) a selection function that represents the virtual shift illustrated in FIG. 2. FIG. 4 illustrates a column based selection process that is equivalent to the process illustrated in FIG. 1.

The virtual shift provides a graded array of sets of data units.

Assuming, for example, that the eight sets 21-28 form a matrix of eight rows and (N+7) columns (obtained by virtually zero padding the columns that include less than eight units), then the first column includes D1(1), the second column includes D1(2) and D2(1), the third column includes D1(3), D2(2) and D3(1), the eight column includes D1(8), D2(7), D3(6), D4(5), D5(4), D6(3), D7(2) and D8(1), the (N+7)'th column includes D8(N).

The second set of parity units 29 includes (N+7) parity units—wherein the q2'th parity unit (index q2 ranges between 1 and (N+7)) is calculated by applying a mathematical function (such as XOR) on the elements of the q2'th column of the staggered array.

As indicated above—the first shift is virtual—and can be replaced by processing the first group 10 of sets 11-18 while taking into account the virtual shift of one data unit between one set to another. Thus, the q2'th parity unit of the second set of parity units can be calculated by processing n'th data units of m'th sets of data units, i.e. all Dm(n) that fulfill $q2=(n+[S1*\{m-1\}])$, wherein S1 is the first shift, m is the index of the data set (in this example, may range between 1 to 8) and n is the index of the data unit within the data set. For example, if S1=1 (a single shift), the first (q2=1) parity unit of the second set of parity units equals D1(1) (n=1, m=1). The second (q2=2) parity unit of the second set of parity units is calculated by processing D1(2) and D2(1). The third (q2=3) parity unit of the second set of parity units is calculated by processing D1(3), D2(2) and D3(1).

FIG. 3 illustrates a third group 30 of eight sets 31-38 of data units. Each set of data units 31-38 includes N data units. The third group 30 of data units is obtained by virtually introducing a second shift of two data units between the eight sets 11-18 of data units of the first group 10 of FIG. 1. The shift is virtual as is may be implemented by changing the selection of data units that should processed when calculating the parity units of the third set 39 of parity units.

The virtual shift provides a graded array of sets of data units. Assuming, for example, that the eight sets 31-38 form a matrix of eight rows and (N+14) columns, then the first column includes D1(1), the second column includes D1(2), the third column includes D1(3) and D2(1), the eight column includes D1(8), D2(6), D3(4) and D4(2), the fifteenth column includes D1(15), D2(13), D3(11), D4(9), D5(7), D6(5), D7(3) and D8(1), and the last column includes D8(N).

The third set of parity units 39 includes (N+14) parity units—wherein the q3'th parity unit (index q3 ranges between 1 and (N+14)) is calculated by applying a mathematical function (such as XOR) on the elements of the q3'th column of the staggered array.

Figure 6:
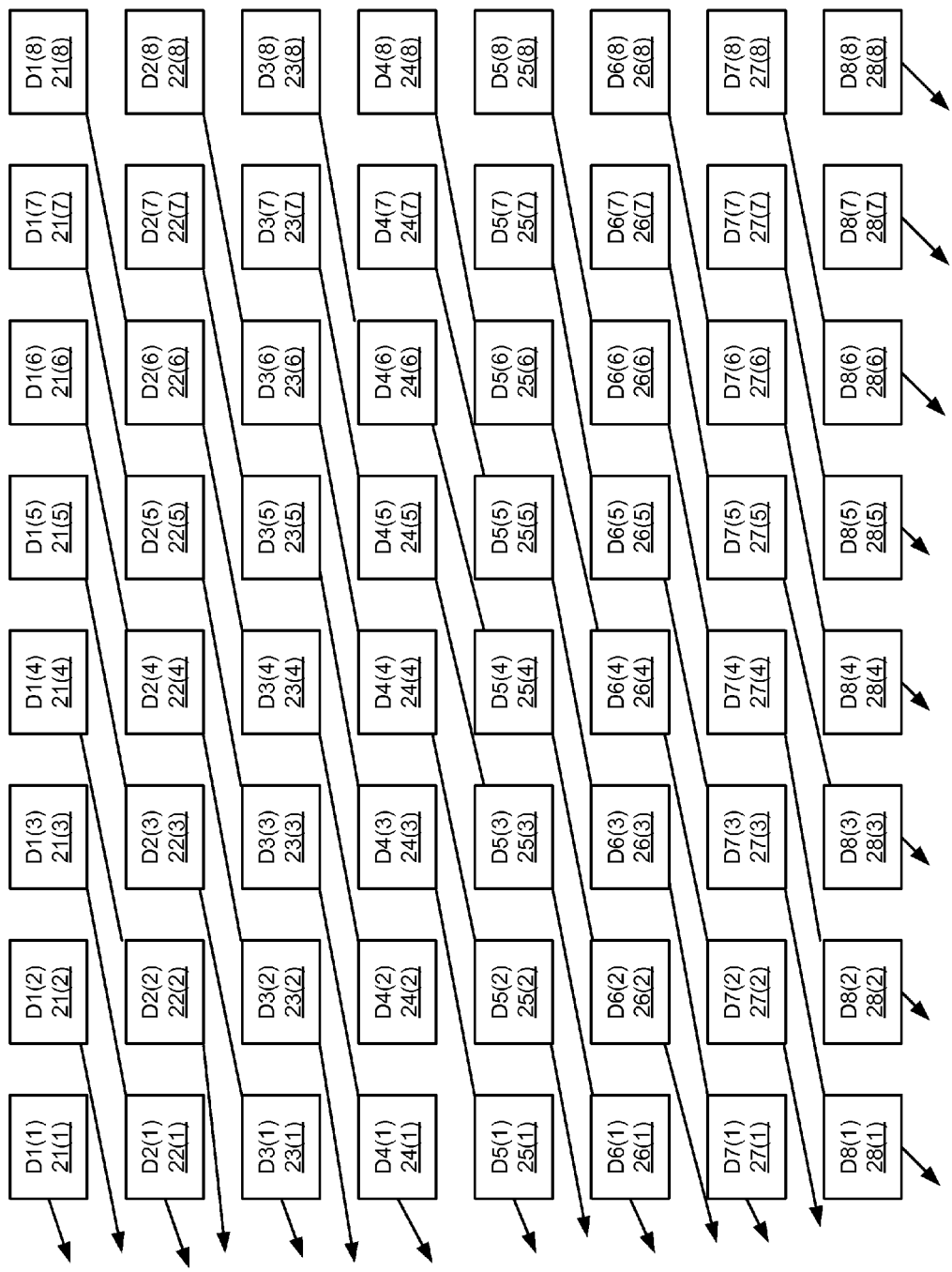

As indicated above—the second shift is virtual—and can be replaced by processing the first group 10 of sets 11-18 while taking into account the virtual shift of two data unit between one set to another. For example—FIG. 6 illustrates (by arrows linking data units) a selection function that represents the virtual shift illustrated in FIG. 3.

Thus, the q3'th parity unit of the third set of parity units can be calculated by processing n'th data units of m'th sets of data units, i.e. all Dm(n) that fulfill $q3=(n+[S2*\{m-1\}])$, wherein S2 is the second shift.

For example, if S2=2 (double shift), the first (q3=1) parity unit of the third set of parity units equals D1(1). The third (q3=3) parity unit of the third set of parity units is calculated by processing D1(3) and D2(1). The fifth (q3=5) parity unit of the third set of parity units is calculated by processing D1(5), D2(3) and D3(1).

Table 1 illustrates some of the data units that are includes in the first eight virtual columns ("col") of an array formed by the sets of data units (shifted or not) for obtaining parity units of the first, second and third sets of parity units (denoted P1, P2 and P3 respectively).

|    | Col 1 | Col 2 | Col 3 | Col 4 | Col 5 | Col 6 | Col 7 | Col 8 |
|----|-------|-------|-------|-------|-------|-------|-------|-------|
| P1 | D1(1) | D1(2) | D1(3) | ...   |       |       |       |       |
|    | D2(1) | D2(2) | D2(3) |       |       |       |       |       |
|    | D3(1) | D3(2) | D3(3) |       |       |       |       |       |
|    | D4(1) | D4(2) | D4(3) |       |       |       |       |       |
| P2 | D1(1) | D1(2) | D1(3) | D1(4) |       |       |       |       |
|    |       | D2(1) | D2(2) | D2(3) |       |       |       |       |
|    |       |       | D3(1) | D3(2) |       |       |       |       |
|    |       |       |       | D4(1) |       |       |       |       |
| P3 | D1(1) | D1(2) | D1(3) | D1(4) | D1(5) | D1(6) | D1(7) | D1(8) |
|    |       |       | D2(1) | D2(2) | D2(3) | D2(4) | D2(5) | D2(6) |
|    |       |       |       |       | D3(1) | D3(2) | D3(3) | D3(4) |
|    |       |       |       |       |       |       | D4(1) | D4(2) |

The Rebuild Process.

In a case of one disk failure, e.g., the disk that holds set of data units D1, a simple XOR is applied on all units of the other sets of data units, without applying a virtual shift on the first set of parity units.

In a case of two disk failure, there is always at least one column in the second parity group that includes a data unit of a set of data units of one failed disk and does not include a data unit of any set of data units of the second failed disk. For example, suppose the failed disks are two disks that hold sets of data units D1 and D2, the first column include a data unit of D1 and does not include any data unit of D2, so that D1(1) is extracted immediately, as P2(1) is equal to D1(1).

The next step is to use the first column C1 of the first parity group and the newly extracted D1(1), so as to extract D2(1).

The next step is to use the second column C2 of the second parity group and the extracted unit D2(1), so as to extract D1(2).

Now the second column C2 of the first parity group and the extracted D1(2), so as to extract D2(2).

In a case of three concurrent disk failures that holds sets of data units D1, D2 and D3, the three parity groups are used in the following manner:
  A. D1(1) and D1(2) are instantly extracted from P3(1) and P3(2) of the third parity.
  B. D2(1) is extracted from the second column of the second parity group using D1(2).
  C. D3(1) is extracted from the first column of the first parity group, using D1(1) and D2(1).
  D. D1(3) is extracted from column 3 of the third parity group, using previously extracted D2(1)
  E. D2(2) is extracted from column 3 of the second parity group, using extracted D1(3) and D2(1).

The mentioned above scheme is an example of rebuild process of three failed disks with a complexity level of a rebuild process of a single failed disk.

FIGS. 1-3 illustrate (a) a reconstruction from one, two and three disk failures, (b) a first group that includes eight sets of data units, and (c) a calculation of a parity unit by selecting elements of a virtual column of a table formed by the sets of data units (shifted or not shifted), (d) applying a XOR function to calculate a parity unit.

It is noted that these are non-limiting examples. As indicated above the reconstruction can be done from two or more than three disk failures (K may differ from three). The recovery process can be applied on a failure of first, second and third number of disks that differ from one, two and three. More than three disk failures can be supported by implementing more than three parity sets, wherein each additional parity set can be supported by increasing the virtual shift used for the selection function, for example, the second parity set is calculated by introducing a shift of one data unit between each set of data units of the first group of sets of data units, the third parity set is calculated by introducing a shift of two data units between each set of data units of the first group of sets of data units, the forth parity set can be calculated by introducing a shift of three data units between each set of data units of the first group of sets of data units, and each additional supported parity can be calculated by introducing a shift of additional data units. The XOR function can be replaced by another mathematical function. The selection of a column of data units can be replaced by another selection function that selects data units that do not form a column of an array virtually formed by the first group of sets of data units (whether virtually shifted or not).

Figure 7:
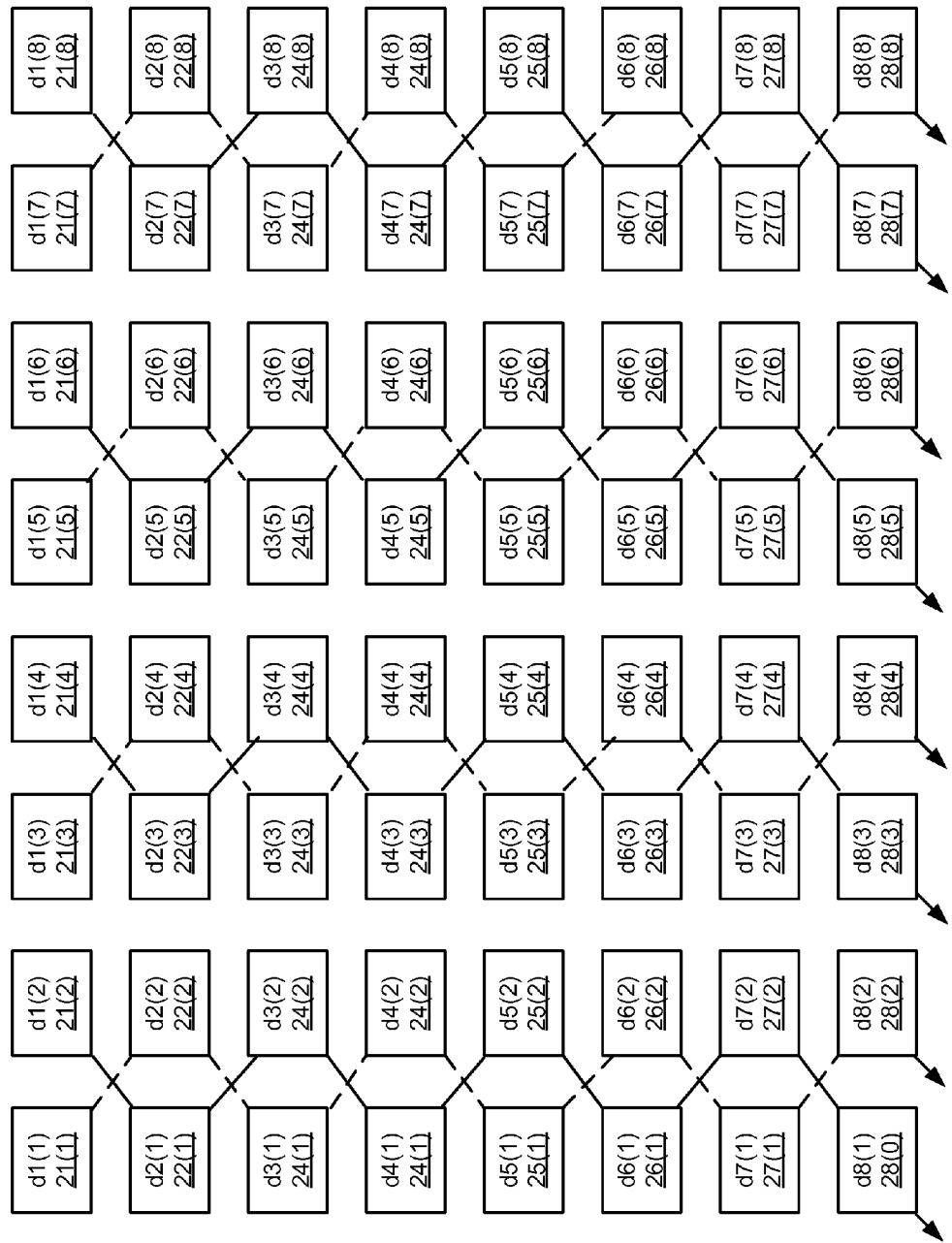
FIG. 7 illustrate the calculations of a set of parity units according to an embodiment of the invention.

The selection function should select a data unit from at least one set of data unit (shifted or not) and may not use the same data units for calculating different parity units. A non-limiting example is a selection function that selects a column of data units for calculating a parity unit. Yet for another example, a selection function may elect data units in a staggered or stepped manner or from multiple columns of the array. A staggered selection is illustrated in FIG. 7 in which four combinations of data units (linked by dashed lines) are used for generating four parity units and four other combination (linked by non-dashed arrows) are used for generating four parity units.

FIG. 8 illustrates method 200 according to an embodiment of the invention.

Method 200 may start by stage 210 of calculating a first set of parity units by processing a first group of sets of data units that are cached in a cache memory of a storage system.

The first set of parity units facilitates a reconstruction of the one of more sets of the first group of sets of data units when a first number of disks out of a first group of disks fail.

Referring to the example set forth in FIG. 1—the first number equals one and the calculation of the first set of parity units per se may allow a recovery from a failure of a single disk.

Stage 210 is followed by stage 220 of calculating a second set of parity units by processing the first group of the sets of the data units. The calculating of the second set of parity sets is responsive to a first shift that was virtually introduced between each set of data units of the first group of sets of data units. A combination of the first and second sets of parity units facilitate a reconstruction of the first group of sets of data units when a second number of disks of the first group of disks fail. The second number is bigger than the first number.

Referring to the example set forth in FIG. 2—the first shift equals a single data unit and the second number equaled two. The first and second sets of parity units allow a recovery from a failure of two disks.

Stage 220 may be followed by stage 230 of destaging the first group of sets of data units and the first and second sets of parity units to the first group of disks. The destaging includes writing each data set and parity set to a different disk of the first group of disks.

Stages 220 can be repeated multiple (K) times, for different virtual shifts for providing more than two sets of parity units that will allow a recovery from a failure of multiple disks.

Each set of data units may include a first number (N) of data units. The first group includes a second number (M) of sets of data units. The first shift equals a third number (S1) of data units. It may equal one data unit but may equal other values. S1 exceeds zero. The first set of parity units may include N parity units. The second set of parity units may include $N+(M-1)*S1$ parity units.

Assuming that a first index m is indicative of an order of a set of data units within the first group, that index n is indicative of a location of a data unit within a set of data units and that index q2 is indicative of a location of a parity unit within the second set of parity units. Under these assumptions stage 220 may include stage 222 of calculating, for each value of q2, a q2'th parity unit of the second set of parity units by processing n'th data units of m'th sets of data units of that fulfills $q2+(n+[S1*\{m-1\}])$.

Assuming that index q1 is indicative of a location of a parity unit within the first set of parity units and that index q2 is indicative of a location of a parity unit within the second set of parity units. Under these assumptions stage 210 may include stage 212 of calculating, for each value of q1, a q1'th parity unit of the first set of parity units by applying a first selection function on the first group of sets of data units for selecting at least one first selected data unit and processing the at least one first selected data unit to provide the q1'th parity unit.

Furthermore, stage 220 may include stage 224 of calculating, for each value of q2, a q2'th parity unit of the second set of parity units by applying the first selection function on the first group of sets of data units while taking into account the first shift that was virtually introduced between each set of data units of the first group of sets of data units for selecting at least one second selected data unit; and processing the at least one second selected data unit to provide the q2'th parity unit. It is noted that the selection function may remain the same through calculations of different sets of parity units, may be the same for some calculations of some sets of parity units or may change between each calculation of set of parity units.

FIG. 9 illustrates method 300 according to an embodiment of the invention.

Method 300 may start by stage 210 of calculating a first set of parity units by processing a first group of sets of data units that are cached in a cache memory of a storage system.

Stage 210 is followed by stage 220 of calculating a second set of parity units by processing the first group of the sets of the data units. The calculating of the second set of parity sets is responsive to a first shift that was virtually introduced between each set of data units of the first group of sets of data units. A combination of the first and second sets of parity units facilitate a reconstruction of the first group of sets of data units when a second number of disks of the first group of disks fail. The second number is bigger than the first number.

Stage 220 may be followed by stage 330 of calculating a third set of parity units by processing the first group of the sets of the data units. The calculating of the third set of parity units is responsive to a second shift that was virtually introduced between each set of data units of the first group of sets of data units.

A combination of the first, second and third sets of parity units facilitate a reconstruction of the first group of sets of data units when a third number of disks of the first group of disks fail. The third number is bigger than the second number Referring to the example set forth in FIGS. 1-3—the third number is three and the first till third sets of parity units facilitate a reconstruction of three failed disk.

Stage 330 may be followed by stage 340 of destaging the first group of sets of data units, and the first, second and third sets of parity units to the first group of disks.

The first and second shifts may be different powers of two or may have other values that are not powers of two. Referring to the example of FIGS. 2 and 3—the first shift is one and the second shift is two data units.

The first set of parity units may include N parity units. The second set of parity units may include N+(M−1)*S1 parity units. The third set of parity unit may include N+(M−1)*S2 parity units, wherein S2 is the second shift.

Assuming that a first index m is indicative of an order of a set of data units within the first group, that index n is indicative of a location of a data unit within a set of data units and that index q3 is indicative of a location of a parity unit within the third set of parity units. Under these assumptions stage 330 may include stage 332 of calculating, for each value of q3, a q3'th parity unit of the third set of parity units, by processing n'th data units of m'th sets of data units of that fulfills q3+(n+[S2*{m−1}]).

Furthermore, stage 330 may include stage 334 of calculating, for each value of q3, a q3'th parity unit of the third set of parity units by applying the first selection function on the first group of sets of data units while taking into account the second shift that was virtually introduced between each set of data units of the first group of sets of data units for selecting at least one third selected data unit; and processing the at least one third selected data unit to provide the q3'th parity unit.

Figure 10:
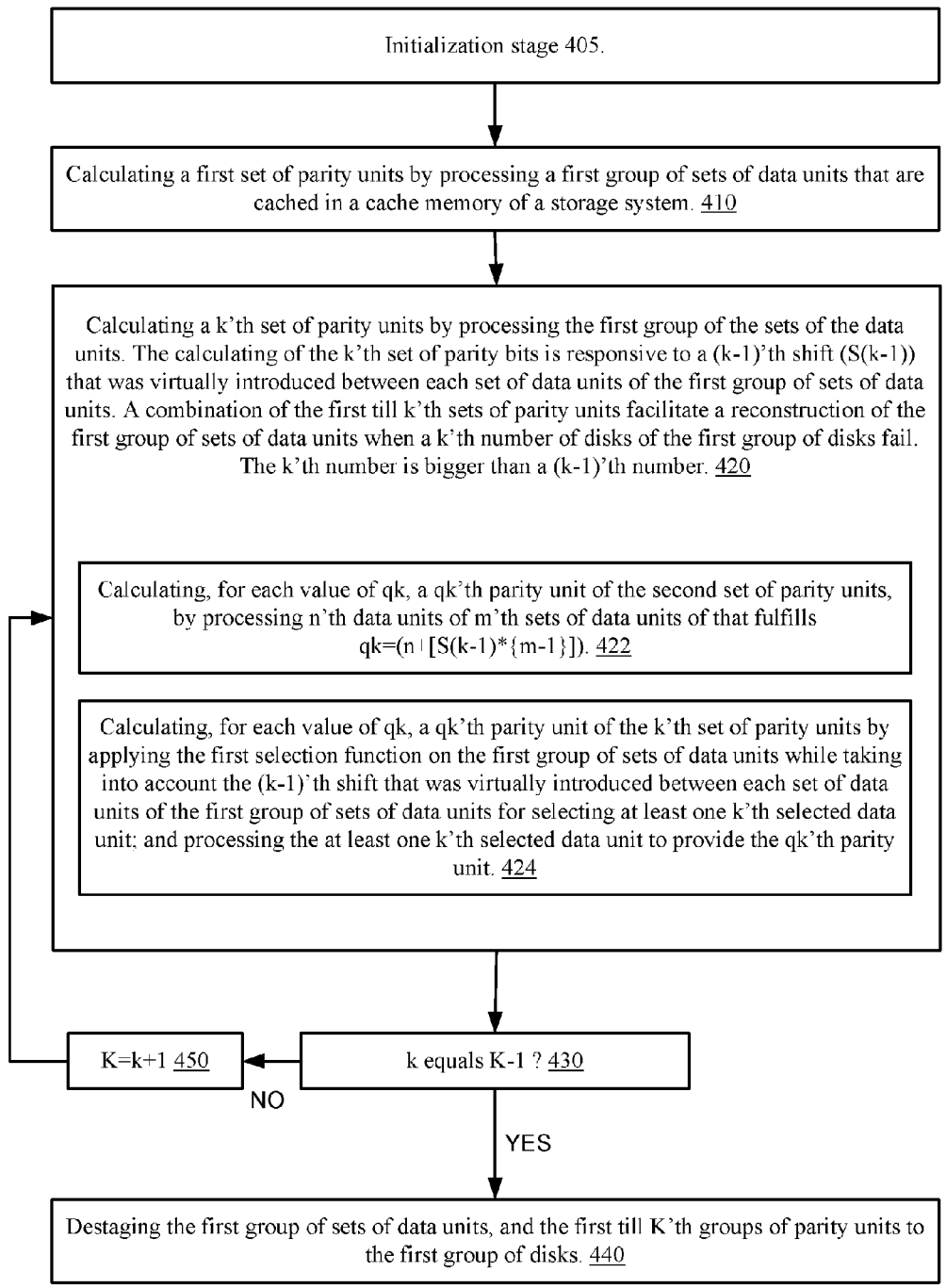

FIG. 10 illustrates method 400 according to an embodiment of the invention.

Method 400 may start by initialization stage 405. Stage 405 may include determining a failure recover scheme—selecting the number (K) of different sets of parity units to calculate, selecting the (K−1) different shifts S(1)–S(K−1) to be introduced between sets of data units, and selecting the selection process for selecting the one or more data units to participate in a calculation of parity units of the set. Stage 405 may also include setting a control variable k to two. Control variable k may range between 1 and K.

Stage 405 is followed by stage 410 of calculating a first set of parity units by processing a first group of sets of data units that are cached in a cache memory of a storage system.

Stage 410 is followed by stage 420 of calculating a k'th set of parity units by processing the first group of the sets of the data units. The calculating of the k'th set of parity units is responsive to a (k−1)'th shift (S(k−1)) that was virtually introduced between each set of data units of the first group of sets of data units. A combination of the first till k'th sets of parity units facilitate a reconstruction of the first group of sets of data units when a k'th number of disks of the first group of disks fail. The k'th number is bigger than a (k−1)'th number.

Stage 420 may be followed by stage 430 of checking if k equals K (and all K sets of parity units were calculated). If—so stage 430 is followed by stage 440. Else-stage 430 is followed by stage 450.

Stage 450 includes increasing control variable k and jumping to stage 420.

Stage 440 includes destaging the first group of sets of data units, and the first till K'th groups of parity units to the first group of disks. The destaging includes writing each set of data units and parities to a different disk of the first group of disks.

The complexity of the reconstruction of the first group of sets of the data units that is facilitated by the combination of the first till K'th sets of parity units is lower than a complexity of a reconstruction of the first group of sets of the data units that is based on a calculation of a unique set of parity units that solely facilitates a recovery from a failure of the K'th number of disks of the first group of disks.

The first till (K−1)'th shifts (S(1)–S(K−1)) may be different powers of two or may have other values that are not powers of two.

The first set of parity units may include N parity units. The k'th set of parity units may include N+(M−1)*S(k−1) parity units. Wherein S(k−1) is the (k−1)'th shift.

Assuming that first index m is indicative of an order of set of data unit within the first group, that index n is indicative of a location of a data unit within a set of data units and that index qk is indicative of a location of a parity unit within the k'th set of parity units. Under these assumptions stage 420 may include stage 422 of calculating, for each value of qk, a qk'th parity unit of the k'th set of parity units, by processing n'th data units of m'th sets of data units of that fulfills qk=(n+[S(k−1)*{m−1}]).

Furthermore, stage 420 may include stage 424 of calculating, for each value of qk, a qk'th parity unit of the k'th set of parity units by applying the first selection function on the first group of sets of data units while taking into account the (k−1)'th shift that was virtually introduced between each set of data units of the first group of sets of data units for selecting at least one k'th selected data unit; and processing the at least one k'th selected data unit to provide the qk'th parity unit.

Figure 11:
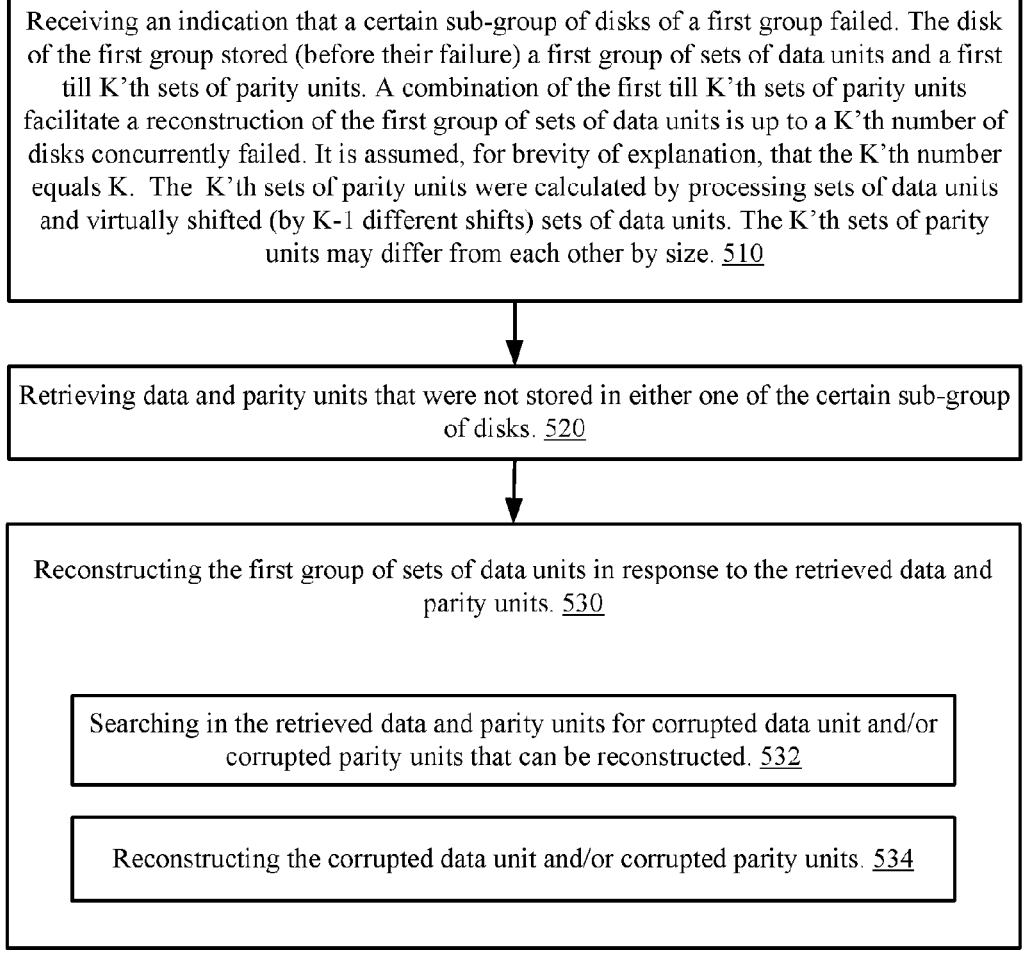

FIG. 11 illustrates method 500 according to an embodiment of the invention.

Method 500 may start by stage 510. Stage 510 may include receiving an indication that a certain sub-group of disks of a first group failed. The disks of the first group stored (before their failure) a first group of sets of data units and a first till K'th sets of parity units.

A combination of the first till K'th sets of parity units facilitate a reconstruction of the first group of sets of data units if up to a K number of disks concurrently failed.

It is assumed, for brevity of explanation, that the K number equals K. The first till K'th sets of parity units may have been calculated by executing method 400.

The K sets of parity units were calculated by processing sets of data units and virtually shifted (by K−1 different shifts) sets of data units. The K sets of parity units may differ from each other by size.

Assuming that there are M sets of data units in the first group of sets of data units and that index m ranges between 1 and M then the k'th set of parity units (k ranges between 2 and K) includes, for each value of m, one or more parity units calculated by processing m data units of m sets of data units.

Referring to the example set forth in FIG. 2:
A. The first and last parity units of the second set of parity units are calculated by processing a single data unit (D1(1) and D8(N) respectively).
B. The second and penultimate parity units of the second sets of parity units are calculated by processing data units from a pair of sets of data units.
C. The eighth till (N−7)'th parity units of the second set of parity units are calculated by processing data units from all eight sets of data units D1-D8.

Stage 510 is followed by stage 520 of retrieving data and parity units that were not stored in either one of the certain sub-group of disks. These data and parity units are referred to as retrieved data and parity units. The data units and parity units stored in the failed disks are referred to as corrupted data units and corrupted parity units.

Stage 520 is followed by stage 530 of reconstructing the first group of sets of data units in response to the retrieved data and parity units.

The reconstructing may include selecting a column (or a produce of another selection function such as the staggered selection of FIG. 7) for reconstruction, the column includes one data/parity unit from one of the failed disks and does not include a data/parity unit from the other failed disks.

Stage 530 may include determining (532), based on the retrieved data and parity units which corrupted data units and/or corrupted parity units that can be reconstructed and reconstructing (534) the corrupted data unit and/or corrupted parity units.

The reconstructive process may be executed in an iterative or gradual manner without trying to reconstruct all corrupted units at once.

Referring to the example set forth in FIGS. 1-3 and assuming that three disks failed, the reconstruction process will try to reconstruct one corrupted unit at a time. It may apply RAID 5 level reconstructions to perform this reconstruction.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

Figure 12:
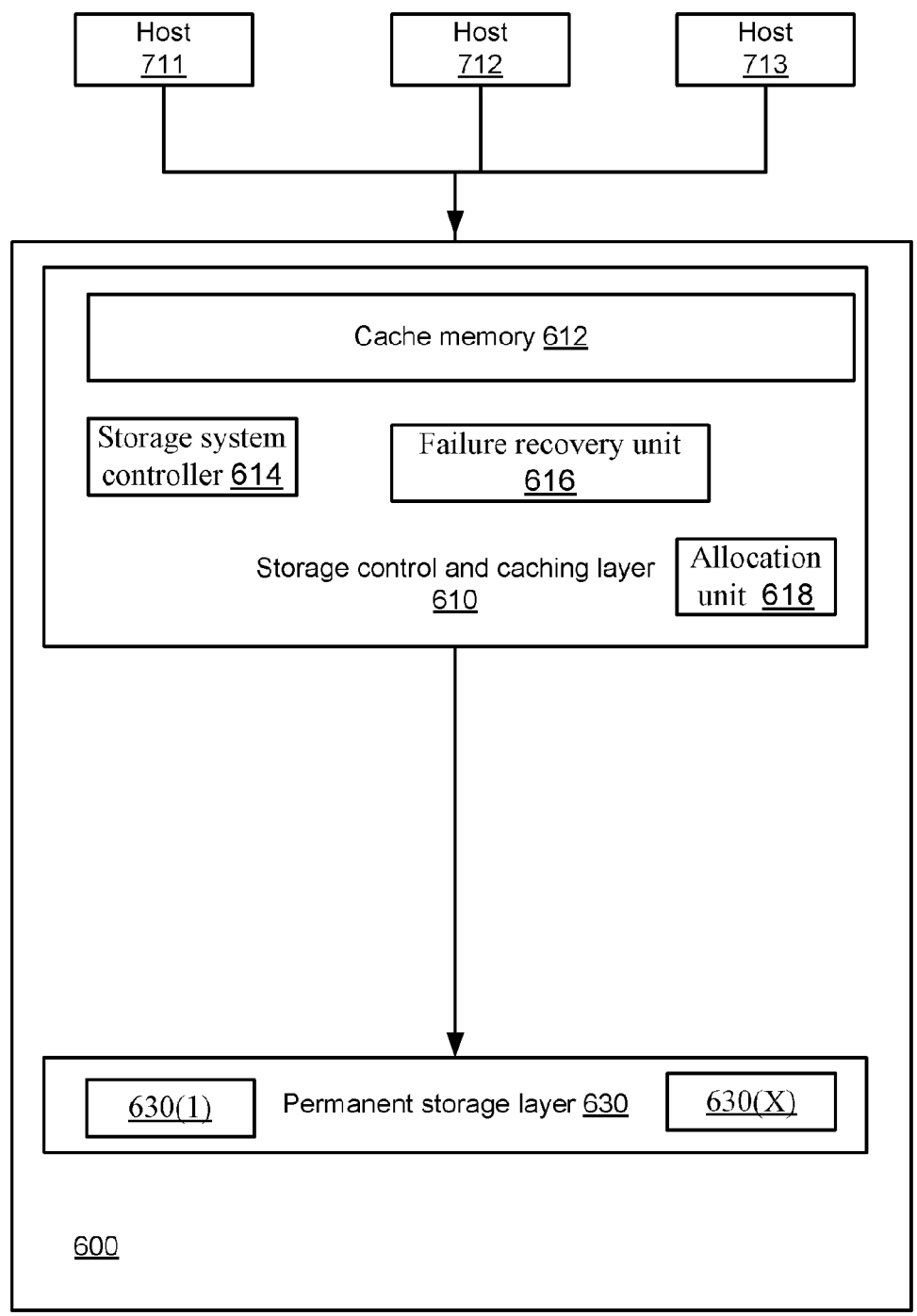
FIG. 12 illustrates a system according to an embodiment of the invention.

FIG. 12 illustrates a storage system 600 according to an embodiment of the invention.

Storage 600 is a mass storage system and may store multiple terabytes-even one petabyte and more. It may include permanent storage layer 630 and storage control and caching layer 610.

System 600 may be accessed by multiple computerized systems such as host computers (denoted "host") 711, 712 and 713 that are coupled to storage system 100 over network 80. The computerized systems 711-713 can read data from the storage system 600 and/or write data to the storage system 600.

The permanent storage layer 630 may include many disks 630(1)-630(X). These many disks may include one or many groups of disks, each group of disks may store sets of data units and parity units. A single disk may store data units and/or parity units associated with different groups of sets of data units.

Storage control and caching layer 610 includes a cache memory 612, a storage system controller 614, a failure recovery unit 616 and an allocation unit 618.

The storage system controller 614 controls the operation of different units of the storage system 600.

Data units written to the storage system 600 are first cached. If it is determined to destage a group of sets of data units then the appropriate sets of parity units are calculated (by executing, for example, method 400)) before the destage and the group of the data units and its associated sets of parity units are destaged to dynamically allocated disks. The allocation of disks is performed by the allocation unit 618. The calculation of the sets of parity units is calculated by the failure recovery unit 616.

The failure recovery unit 616 may also receive an indication that one of more disks failed and recover data. It may execute method 500. Each of these units can be a computer, a processor and the like.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for disk failure protection, the method comprises:
   calculating a first set of parity units by processing a first group of sets of data units that are cached in a cache memory of a storage system;
      wherein the first set of parity units facilitates a reconstruction of the first group of sets of data units when a first number of disks out of a first group of disks fail;
   calculating a second set of parity units by processing the first group of sets of data units; wherein the calculating of the second set of parity units is responsive to a first shift that was virtually introduced between each set of data units of the first group of sets of data units;
      wherein a combination of the first and second sets of parity units facilitate a reconstruction of the first group of sets of data units when a second number of disks of the first group of disks fail;
      wherein the second number is bigger than the first number; and
   destaging the first group of sets of data units and the first and second sets of parity units to the first group of disks.

2. The method according to claim 1 wherein each set of data units comprises multiple (N) data units;
   wherein the first group of sets of data units comprises multiple (M) sets of data units;
   wherein the first shift equals at least one (S1) data unit;
   wherein the first set of parity units comprises N parity units; and
   wherein the second set of parity units comprises N+(M−1)*S1 parity units.

3. The method according to claim 1,
   wherein each set of data units comprises multiple (N) data units;
   wherein the first group of sets of data units comprises multiple (M) sets of data units;
   wherein the first shift equals at least one (S1) data unit;
   wherein a first index m is indicative of an order of a set of data unit within the first group of sets of data units;
   wherein index n is indicative of a location of a data unit within a set of data units;
   wherein index q2 is indicative of a location of a parity unit within the second set of parity units;
   wherein the method comprises calculating, for each value of q2, a q2'th parity unit of the second set of parity units by processing n'th data units of m'th sets of data units of that fulfills q2+(n+[S1*{m−1}]).

4. The method according to claim 1, wherein an index q is indicative of a location of a parity unit within the first set of parity units;
   wherein index q2 is indicative of a location of a parity unit within the second set of parity units;
   wherein the method comprises:
      calculating, for each value of q, a q1'th parity unit of the first set of parity units by:
         applying a first selection function on the first group of sets of data units for selecting at least one first selected data unit;
         processing the at least one first selected data unit to provide the q1'th parity unit; and
      calculating, for each value of q2, a q2'th parity unit of the second set of parity units by:
         applying the first selection function on the first group of sets of data units while taking into account the first shift that was virtually introduced between each set of data units of the first group of sets of data units for selecting at least one second selected data unit; and
         processing the at least one second selected data unit to provide the q2'th parity unit.

5. The method according to claim 1, comprising:
   calculating a third set of parity units by processing the first group of the sets of the data units; wherein the calculating of the third set of parity units is responsive to a second shift that was virtually introduced between each set of data units of the first group of sets of data units;
   wherein a combination of the first, second and third sets of parity units facilitate a reconstruction of the first group of sets of data units when a third number of disks of the first group of disks fail;
   wherein the third number is bigger than the second number; and
   wherein the destaging comprises destaging the third set of parity units to the first group of disks.

6. The method according to claim 5 wherein each set of data units comprises multiple (N) data units; wherein the first group comprises multiple (M) sets of data units; wherein the first shift equals at least one (S1) data units; wherein the second shift (S2) exceeds one and different from S1; wherein the first set of parity units comprises N parity units, the second set of parity units comprises N+(M−1)*S1 parity units and the third set of parity unit comprises N+(M−1)*S2 parity units.

7. The method according to claim 5, wherein each set of data units comprises multiple (N) data units; wherein the first group comprises multiple (M) sets of data units;
   wherein the first shift equals at least one (S1) data unit;
      wherein the second shift (S2) exceeds one and different from S1;
   wherein first index m is indicative of an order of a set of data units within the first group of sets of data units;
   wherein index n is indicative of a location of a data unit within a set of data units;
   wherein index q2 is indicative of a location of a parity unit within the second set of parity units;
   wherein index q3 is indicative of a location of a parity unit within the third set of parity units;

wherein the method comprises:
calculating, for each value of q2, a q2'th parity unit of the second set of parity units, by processing n'th data units of m'th sets of data units of that fulfills q2+(n+[S1*{m−1}]); and
calculating, for each value of q3, a q3'th parity unit of the second set of parity units, by processing n'th data units of m'th sets of data units of that fulfills q3=(n+[S2*{m−1}]).

8. The method according to claim 5, wherein index q1 is indicative of a location of a parity unit within the first set of parity units;
wherein index q2 is indicative of a location of a parity unit within the second set of parity units;
wherein index q3 is indicative of a location of a parity unit within the third set of parity units;
wherein the method comprises:
calculating, for each value of q1, a q1'th parity unit of the first set of parity units by:
applying a first selection function on the first group of sets of data units for selecting at least one first selected data unit;
processing the at least one first selected data unit to provide the q1'th parity unit;
calculating, for each value of q2, a q2'th parity unit of the second set of parity units by:
applying the first selection function on the first group of sets of data units while taking into account the first shift that was virtually introduced between each set of data units of the first group of sets of data units for selecting at least one second selected data unit; and
processing the at least one second selected data unit to provide the q2'th parity unit; and
calculating, for each value of q3, a q3'th parity unit of the third set of parity units by:
applying the first selection function on the third group of sets of data units while taking into account the second shift that was virtually introduced between each set of data units of the first group of sets of data units for selecting at least one third selected data unit; and
processing the at least one third selected data unit to provide the q3'th parity unit.

9. The method according to claim 1 further comprising:
receiving an indication that a certain sub-group of disks of the first group of disks failed, wherein the certain sub-group is formed from a second number of disks;
retrieving, from disks of the first group of disks that do not belong to the certain sub-group of disks, retrieved data and parity units; and
reconstructing the first group of sets of data units based upon the retrieved data and parity units.

10. The method according to claim 9 wherein the reconstructing comprises starting the reconstructing from combinations of retrieved data and parity units that lack data or parity units that were stored in either one of the certain sub-group of disks.

11. The method according to claim 1 comprising calculating, in addition to the first and second sets of parity units, additional (K−2) sets of parity units, wherein K is a positive integer that exceeds two, wherein for each value of index k that ranges between 3 and K, calculating a k'th set of parity units by processing the first group of sets of data units; wherein the calculating of the k'th set of parity units is responsive to a (k−1) shift that was virtually introduced between each set of data units of the first group of sets of data units; wherein a combination of the first set of parity units, the second set of parity units and the additional (K−2) sets of parity units facilitate a reconstruction of the first group of sets of data units when a K'th number of disks of the first group of disks fail.

12. The method according to claim 11 wherein the first shift, the second shift and each one of a (K−2) shifts differ from each other.

13. A non-transitory computer readable medium that stores instructions that once executed by a computerized system, cause the computerized system to execute the stages of: calculating a first set of parity units by processing a first group of sets of data units that are cached in a cache memory of a storage system; wherein the first set of parity units facilitates a reconstruction of the first group of sets of data units when a first number of disks out of a first group of disks fail; calculating a second set of parity units by processing the first group of sets of data units; wherein the calculating of the second set of parity units is responsive to a first shift that was virtually introduced between each set of data units of the first group of sets of data units; wherein a combination of the first and second sets of parity units facilitate a reconstruction of the first group of sets of data units when a second number of disks of the first group of disks fail; wherein the second number is bigger than the first number; and destaging the first group of sets of data units and the first and second sets of parity units to the first group of disks.

14. A storage system, comprising:
a failure recovery unit that is arranged to calculate a first set of parity units by processing a first group of sets of data units that are cached in a cache memory of a storage system; wherein the first set of parity units facilitates a reconstruction of the first group of sets of data units when a first number of disks out of a first group of disks fail; calculate a second set of parity units by processing the first group of sets of data units; wherein the calculating of the second set of parity units is responsive to a first shift that was virtually introduced between each set of data units of the first group of sets of data units; wherein a combination of the first and second sets of parity units facilitate a reconstruction of the first group of sets of data units when a second number of disks of the first group of disks fail; wherein the second number is bigger than the first number; and
a storage system controller that is arranged to destage the first group of sets of data units and the first and second sets of parity units to the first group of disks.

* * * * *